United States Patent
Nance

(10) Patent No.: US 8,565,965 B2
(45) Date of Patent: Oct. 22, 2013

(54) AIRCRAFT LANDING GEAR AUTOMATED INSPECTION FOR PRESENCE OF INTERNAL OXYGEN CONTAMINATION

(76) Inventor: C. Kirk Nance, Keller, TX (US)

( * ) Notice: Subject to any disclaimer, the term of this patent is extended or adjusted under 35 U.S.C. 154(b) by 0 days.

(21) Appl. No.: 13/432,930

(22) Filed: Mar. 28, 2012

(65) Prior Publication Data

US 2012/0253591 A1 Oct. 4, 2012

Related U.S. Application Data

(60) Provisional application No. 61/470,528, filed on Apr. 1, 2011.

(51) Int. Cl.
*G06F 7/00* (2006.01)

(52) U.S. Cl.
USPC ......... 701/34.1; 701/124; 244/17.17; 244/50; 188/284; 188/289; 188/129; 177/141; 324/209; 73/779; 340/960

(58) Field of Classification Search
USPC ............... 701/34, 124; 244/17.17, 50, 102 A, 244/102 R, 104 FP, 100 R, 104 R, 103 R, 108, 244/102 SL; 188/284, 289, 129; 267/64.26; 177/141; 324/209; 73/779; 340/960
See application file for complete search history.

(56) References Cited

U.S. PATENT DOCUMENTS

| | | | | |
|---|---|---|---|---|
| 3,807,668 A * | 4/1974 | Whitener | ................... | 244/104 R |
| 4,061,295 A * | 12/1977 | Somm | ..................... | 244/104 FP |
| 4,092,947 A * | 6/1978 | Labrecque | .................... | 116/227 |
| 4,275,376 A * | 6/1981 | Alexander et al. | ......... | 340/425.5 |
| 4,687,158 A | 8/1987 | Kettering | | |
| 5,521,827 A * | 5/1996 | Lindberg et al. | .............. | 701/124 |
| 6,032,090 A * | 2/2000 | von Bose | ........................ | 701/37 |
| 7,193,530 B2 * | 3/2007 | Nance | .......................... | 340/960 |
| 7,274,309 B2 * | 9/2007 | Nance | .......................... | 340/960 |
| 7,274,310 B1 * | 9/2007 | Nance | .......................... | 340/960 |
| 7,552,803 B2 | 6/2009 | Luce | | |
| 2004/0129834 A1 | 7/2004 | Luce | | |
| 2005/0229968 A1 | 10/2005 | Jones | | |
| 2006/0220917 A1 * | 10/2006 | Nance | .......................... | 340/960 |
| 2006/0284008 A1 * | 12/2006 | Nance | ...................... | 244/100 R |
| 2007/0235585 A1 * | 10/2007 | Nance | ...................... | 244/100 R |
| 2008/0033607 A1 | 2/2008 | Zeliff | | |
| 2008/0119967 A1 | 5/2008 | Long et al. | | |

OTHER PUBLICATIONS

Prof. Shakhashiri, Chemichal of the Week, 2007, Internet, p. 1-2.*
PCT/US2012/031051, filed Mar. 29, 2012, Applicant: C. Kirk Nance, International Search Report and Written Opinion dated Jun. 28, 2012, 7 pages.

* cited by examiner

*Primary Examiner* — McDieunel Marc
(74) *Attorney, Agent, or Firm* — Geoffrey A. Mantooth

(57) ABSTRACT

A system for use in monitoring, measuring, recording, computing and transmitting the oxygen levels and identification of oxygen contamination within an aircraft telescopic landing gear strut. An oxygen sensor is mounted in relation to each of the landing gear struts as to monitor, recognize, measure and record the identification of oxygen within the telescopic landing gear struts. The amount of oxygen within each landing gear strut is measured and recorded and downloaded to the responsible aircraft maintenance department. By detecting the amount of oxygen in a strut, steps can be taken to purge the gas from the strut to minimize corrosion of strut components and to prevent internal combustion of the gas and oil in the strut.

13 Claims, 4 Drawing Sheets

AIRCRAFT LANDING GEAR AUTOMATED INSPECTION FOR PRESENCE OF INTERNAL OXYGEN CONTAMINATION

This application claims the benefit of U.S. provisional patent application Ser. No. 61/470,528, filed Apr. 1, 2011.

BACKGROUND OF THE INVENTION

There are many critical factors the pilot of an aircraft must consider with an aircraft before departure. One of those factors is the correct servicing levels of the internal fluids within the aircraft landing gear struts. Aircraft manufacturers determine, certify and publish maximum gross take-off and landing weight limitations of the aircraft. Aircraft manufacturers also have restrictions regarding the maximum allowable weight the aircraft landing gear and other supporting structures can safely absorb, when the aircraft lands. These landing weight restrictions are often determined not by how much weight the landing gear can safely handle at any single landing, but more as to the fatigue life of the landing gear system, in relation to the life expectancy of the aircraft, as a whole. The aircraft manufacturer must consider the possibility that bad weather at the airport or poor landing skills of less experienced pilots might cause "hard landing events", which put much greater strain on the components and drastically shorten the anticipated fatigue life of the components. For instance, a heavily loaded aircraft making a smooth landing puts less strain on the aircraft and landing gear system, than a lightly loaded aircraft which lands either abruptly or asymmetrically, where one of the main landing gear makes ground contact first and must endure all of the force of the initial impact. Aircraft manufacturers which offer their airplanes through lease arrangements often find that after the initial lease period, it difficult to sell or re-lease the returned, mid-life aircraft, when the aircraft are returned with an expensive component such as the landing gear system, "run-out" to the absolute limits of its useful life.

Telescoping type landing gear have a sealed interior chamber that contains the internal fluids. The internal fluids include oil and nitrogen gas. Nitrogen gas is used for several reasons, one of which is to minimize corrosion of strut components; while another is that nitrogen gas is an inert gas, and, unlike oxygen gas, will not promote combustion.

In an airline operation, pilots will walk around the aircraft, at the departure gate, inspecting the aircraft. Part of that inspection process is to determine if the landing gear struts are properly serviced. As a "rule-of-thumb" pilots typically look for 4 inches of exposed chrome on the landing gear strut's telescopic piston, which supports the weight of the aircraft. If the pilot inspection finds a strut with only 2 inches of exposed chrome, the pilot will report the "low strut" to airline maintenance, and a technician will be sent out to correct the problem. Often, at smaller airports where the airline does not maintain full-time maintenance personnel, the airline will share the services of other airline technicians. Many of these airports sometimes have limited resources for maintaining the aircraft. If a landing gear strut is in need of additional nitrogen gas, and there is no bottle of compressed nitrogen gas available; landing gear servicing manual do allow for the use of compressed air, in place of the nitrogen gas. This is the point where oxygen can possibly be introduced to the inside of the landing gear, thus create an environment which will promote internal corrosion. If compressed air is introduced into the strut and the technician (possibly being an employee of a different airline) does not contact the maintenance department for the aircraft that was just serviced, the oxygen can remain within the landing gear for a long period of time. If this landing gear has a history of being identified as low, requiring a servicing event, chances are the same landing gear will require additional servicing, where additional oxygen can be introduced into the strut. Thus the environment which can promote corrosion can compound. These maintenance mis-practices are well known within the airline industry as well as by the aircraft manufacturers, but the manufacturers have no way to correct the problem for introduction of oxygen to the landing gear struts . . . thus the manufacturers will often assume a worst-case scenario, when they publish the Calendar Life limitations for the landing gear overhaul cycles.

An aircraft manufacturer must determine inspection and/or life cycle limitations based on estimated wear and tear on the landing gear systems by any given operator. There are two primary limitations which aircraft landing gear manufactures place upon their equipment, in an attempt to insure the landing gear strut remains in a robust configuration. These two limitations are "Number of Landing Cycles" and "Calendar Life" limitation. Number of Landing Cycles is based upon actual utilization of the aircraft in terms of landing events. As shown by examples below, some aircraft experience high utilization, while others experience low utilization. Calendar Life is based upon the manufacturer's concern regarding corrosion of internal landing gear components. These components are not subject to visual inspection unless the aircraft is removed from service and the strut disassembled. Typical aircraft operated by most of the major airlines, are manufactured to FAA Regulations—Part 25 "design criteria" (ie: Part 25 aircraft are for example Boeing 737, 747, 757, 767, 777, etc.) and have a Number of Landing Cycle limitations of around the 20,000 cycles, along with a Calendar Life limitation of about 120 months. Assuming a typical airline carrier aircraft has a daily utilization of 6 flights per day, further assuming 350 active flight-days per year; after a period of 111 months, that aircraft would fly and cycle the landing gear 19,980 times; being 20 cycles prior to the 20,000 Landing Cycle limitation. That same 111 months would be 9 months prior to the Calendar Life limitation.

For a better understanding as to the variety of aircraft utilization patterns, as an initial example: airlines such as Southwest Airlines, with their typical 45 minute flight-leg and 14 minute airport turn-times, have their aircraft departing every hour, on the hour. This allows the airline to get up to 14 flights per day for each aircraft. This high utilization has that aircraft reaching 19,740 landing cycles in just 47 months, 73 months before the Calendar Life limitation.

To use another example for an airline that has large international operations, such as American Airlines: changing the daily utilization assumption to that of a wide-body Boeing 777, used primarily to fly passengers from Dallas/Ft Worth to Paris, France in daily operations, that aircraft has only 2 landing cycles per day. During the 120 months of Calendar Life limitation, the Landing Cycle total would be only 7,200 landing events, against a 20,000 Landing Cycle life limitation.

The question then arises . . . how can one get an increase in the Calendar Life limitation? Internal corrosion, which degrades landing gear structural integrity, is primarily caused by the introduction of oxygen to the inside the landing gear strut. All landing gear strut maintenance procedures identify nitrogen gas as the preferred gas to be used to inflate a landing gear strut. Nitrogen is an inert gas, and does not promote corrosion within the landing gear strut.

The prior art which offer aids in monitoring landing gear health and the servicing levels of fluid and gas volumes within the landing gear strut are well known and well documented.

Reference may be made to Technical Paper #02WAC-19, by Sidney G. Allison, NASA Langley Research Center—Ultrasonic Measurement of Aircraft Strut Hydraulic Fluid Level, which teaches the installation of sonic sensors to the external surface of the landing gear, with such ultra-sound patterns monitored to detect fluid and gas separation within the strut. US Patent Application US 2006/0144997 A1,—Gear, R. Kyle Schmidt, et al.—Method and System for Health Monitoring of Landing Gear—teaches the addition of various sensors to landing gear brakes, tires, hydraulics and electrical systems, and switches which initiate landing gear strut deployment and use. U.S. Pat. No. 4,092,947, Jean P. Labrecque—teaches the utilization of a sliding rod, traveling with the telescopic movement of the landing gear strut piston, where the sliding rod will rupture a strategically located disk, when oil level is low. US Patent Application US 2007/0069072 A1, William E. Luce—Aircraft Shock Strut Having a Fluid Monitor—teaches the installation of a fiber-optical, liquid sensing probe, inserted into the telescopic landing gear, to monitor oil levels. Prior art by this inventor (Nance) U.S. Pat. No. 7,274,309 and U.S. Pat. No. 7,274,310 which measure aircraft vertical velocity and thus the Kinetic Energy generated at initial touch-down. The prior art including the prior art of this inventor (Nance) U.S. Pat. No. 7,193,530 teaches landing gear life limit escalation through the monitoring of additional landing load data, accumulated with every aircraft landing event, to build an actual life history of the landing gear, to be used in comparison of the aircraft manufacturers' assumption of landing gear use or possible abuse, to develop the documentation necessary, with engineering review, to allow increases in the life limitation of the aircraft landing gear system.

In addition to causing corrosion, the introduction of oxygen into the inside of the landing gear can create an environment which will promote internal combustion. This internal combustion within the landing gear strut will be in the form of what is commonly known as a "diesel effect." The diesel effect happens as the aircraft lands, compressing the strut. The weight of the aircraft, transfers an equivalent landing load as the landing gear come into contact with the runway. The dissipation of these landing loads generates a large amount of internal heat within the landing gear strut. The landing gear strut uses a method of squeezing hydraulic fluid, through a small internal orifice within the landing gear strut. The fluid friction of the hydraulic oil squeezing through the orifice generates heat. The hydraulic fluid will atomize, thus reduce to tiny particles or a fine spray, as it passes through the orifice; sometimes creating foam as it mixes with the compressed gas. The hydraulic fluid used in typical aircraft landing gear struts is an H-5606 mil-oil and said oil is quite flammable. The compression of the strut increases internal strut pressure and thus increases heat within the strut chamber, while the flammable fluid is distributed within the oxygen contamination of the strut; thus a diesel explosion can occur.

SUMMARY OF THE INVENTION

There is provided an apparatus for monitoring the landing gear strut of an aircraft. The landing gear strut is telescopic and contains an interior inert gas. The apparatus also includes an oxygen sensor and a processor. The oxygen sensor is mounted to the landing gear strut and is exposed to the interior gas of the landing gear strut. The processor is connected to the oxygen sensor. The processor records information from the oxygen sensor.

In accordance with one aspect, the landing gear strut comprises a service port. The oxygen sensor is located in the service port.

In accordance with another aspect, the landing gear strut comprises a service port. A coupling is connected to the service port. The oxygen sensor connected to the coupling.

In accordance with another aspect, an accumulator is in communication with the landing gear strut interior gas. The oxygen sensor is located so that the interior gas flows relative to the oxygen sensor as the strut compresses and decompresses.

In accordance with another aspect, a pressure sensor is exposed to the interior gas. The processor is connected to the pressure sensor.

There is also provided a method of monitoring a landing gear strut of an aircraft. The landing gear strut is telescopic and contains interior gas. Oxygen which would be a contaminant to the interior gas is identified and measured, and the measurement is recorded. The method determines if the measured oxygen is within an acceptable limit. If the measured oxygen is not within the acceptable limit, then an indication is provided.

In accordance with another aspect, the measuring of oxygen in the interior gas further comprises measuring oxygen as the strut is compressing or extending.

In accordance with another aspect, if an indication is provided, then the interior gas is purged from the strut.

In accordance with another aspect, the strut has an estimated calendar life based upon internal corrosion of the strut. Plural measurements of the oxygen are taken. The measurements are used to adjust the calendar life limitation of the strut.

In accordance with another aspect, determining if the measured oxygen is within an acceptable limit further comprises determining if the measured oxygen can cause combustion in the strut interior.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

DETAILED DESCRIPTION OF THE PREFERRED EMBODIMENT

Figure 1:
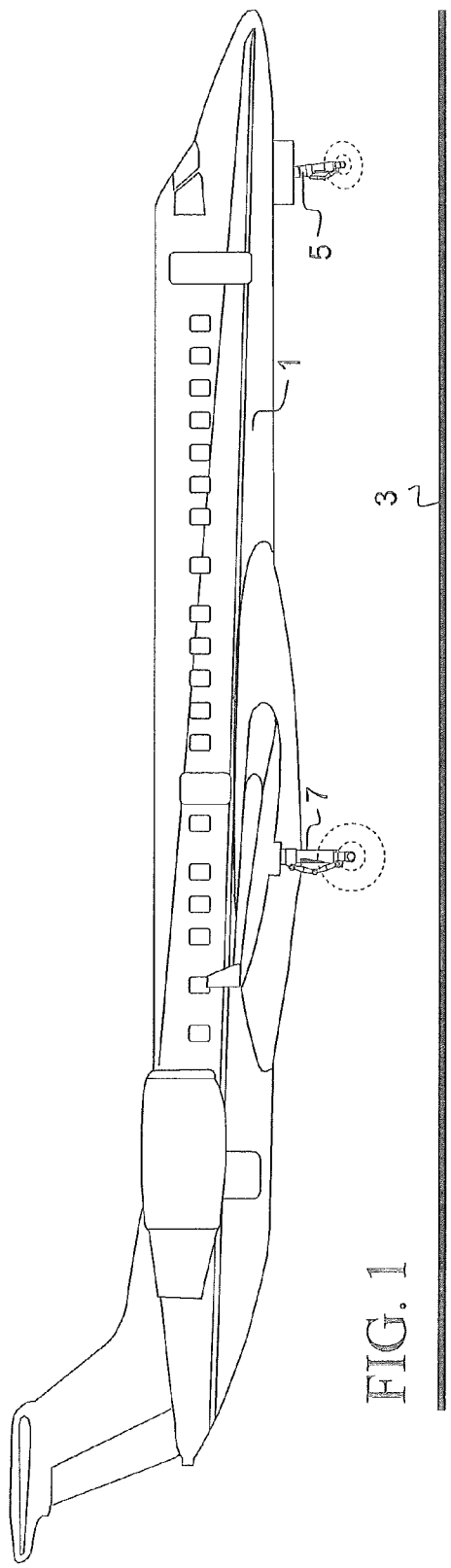
FIG. 1 is a view of a typical commercial aircraft, with landing gear in the fully extended position, in-flight above the ground.

An aircraft is typically supported by plural pressurized landing gear struts. Each landing gear strut is designed much like, and incorporates many of the features of a typical shock absorber. The shock absorber of the landing gear strut comprises internal fluids, both hydraulic fluid and compressed nitrogen gas. Nitrogen, being an inert gas, will not promote corrosion to the internal components or combustion within the landing gear. Still, landing gear manufacturers realize improper landing gear servicing practices exist, throughout the world. Landing gear struts which appear to be low, and when access to a bottle of compressed nitrogen gas is not available, the landing gear are often injected with compressed air, or even sometimes compressed $O_2$ (which is typically located at most aircraft maintenance facilities, for use to re-charge the pilot/cockpit emergency oxygen tanks, onboard the aircraft). The introduction of oxygen into the landing gear strut creates an internal environment within the strut which will promote corrosion of the inner components of the landing gear strut and combustion inside the strut. Because the aircraft manufacturer does not have a representative inspecting every landing gear servicing event to identify when compressed air or pure oxygen are injected into the strut, the manufacturer must instead make assumptions as to the amount of corrosion that will develop within the landing gear, throughout the life of the landing gear, based on historical reports and records from similar type gear being serviced by a variety of different operators. The landing gear manufacturer considers the number of landing events in determining structural component Life Cycle Limitations for the strut. Life Cycle Limitations are determined by the aircraft and other component manufacturers, and are often based on assumptions of landing gear usage and abuses which are far in excess of what the landing gear actually experiences. The landing gear manufacturer will also impose Calendar Life Limitations, which are often based on the amount and evidence of corrosion generated in the aircraft industry, as a whole.

An added system assembly to the landing gear is installed, which assembly includes an oxygen sensor which will allow an onboard computer to monitor and determine the presence of oxygen, as well as measure the amount of oxygen. The system can also track and record the period of time for which the internal components of the landing gear were exposed to the oxygen gas. Many airline operations have their aircraft returning to maintenance hangers for over-night lubrications and minor maintenance, typically scheduled on 3-day increments. Having the ability to identify the presence of oxygen within the strut and having the opportunity to correct the problem with 72 hours will dramatically reduce the amount of internal corrosion, thus allowing landing gear manufacturers to escalate and increase the Calendar Life limitation of the landing gear they manufacture.

As an aircraft lands, the vertical descent of the aircraft onto the airport runway generates load onto the landing gear, forcing it to compress. The compression of the landing gear re-locates the internal nitrogen gas from the larger volume of the fully extended strut, into a much smaller volume of the fully compressed strut. The compression of the landing gear strut, during the landing event, creates gas flow. Oxygen ($O_2$) sensors are available in a variety of designs. The oxygen sensor design preferred would be that of the wide band type, which function best with some movement or flow of the gas across the sensor surface. However, an oxygen sensor could be used which sensor did not require gas flow.

The system automatically monitors and inspects aircraft landing gear struts for the introduction of oxygen into the strut. In the preferred embodiment this is accomplished by sensing flow of internal compressed gas across an embedded oxygen sensor. The amount of trace oxygen within the compressed gas is monitored and measured during each and every landing event, as the strut compresses. Over time, landing gear manufacturers can evaluate the landing gears which have been equipped with this new system to verify the reduced amount of internal component corrosion experienced by operators who use this system to better detect un-wanted oxygen contamination within the struts. Upon detection of the oxygen gas, landing gear strut servicing procedures can be scheduled to purge the un-wanted oxygen contamination, thus allowing the landing gear manufactures to re-calculate and escalate the Calendar Life limitations for landing gear equipped with a system to monitor for oxygen contamination.

Referring now to the drawings, wherein like reference numerals designate corresponding parts throughout the several views and more particularly to FIG. 1 thereof, there is shown a typical commercial aircraft 1, flying above the ground 3, with landing gear configuration, consisting of a fully-extended telescopic nose landing gear 5, and showing one of the plural fully-extended telescopic main landing gear 7.

Figure 2:
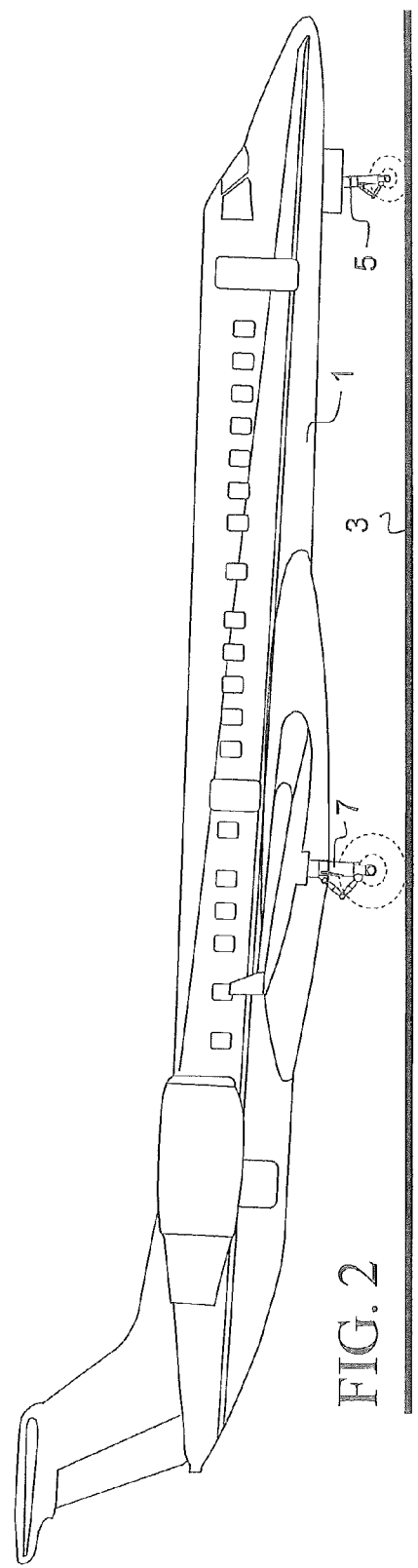
FIG. 2 is a view of a typical commercial aircraft, with landing gear in a slightly compressed position, as the aircraft comes into initial contact with the ground

Referring now to FIG. 2, there is again shown a typical commercial aircraft 1 coming into initial contact with the ground 3, with landing gear configuration consisting of a slightly compressed telescopic nose landing gear 5, and one of plural slightly compressed telescopic main landing gear 7, as they are being initially compressed, by the transfer and absorption for the landing loads of aircraft 1. In the description, like reference numbers among the figures designate like components. The entire disclosure of U.S. Pat. No. 7,193,530 is incorporated herein. This patent discusses in detail, among other things, various types of landing gears such as a piston-type and a trailing arm type.

Figure 3:
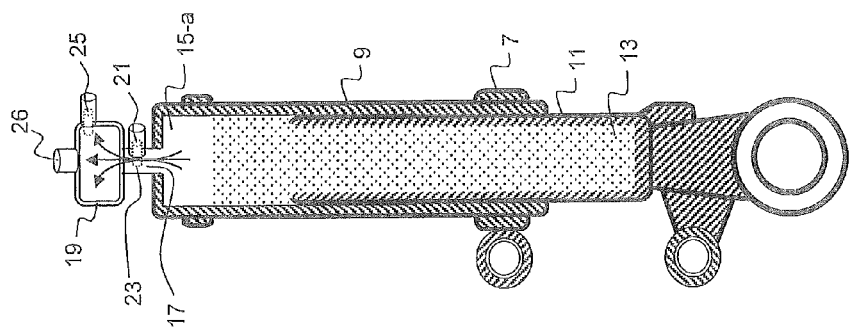
FIG. 3 is a cross-sectional view of a typical commercial airliner landing gear strut in the fully extended position, with telescopic piston, internal hydraulic fluid and compressed nitrogen gas, in accordance with a preferred embodiment.
Figure 4:
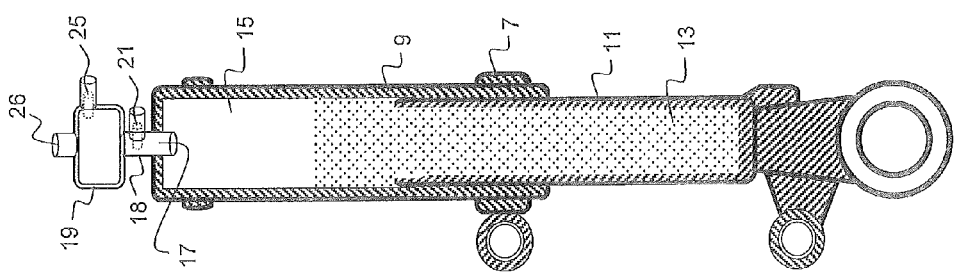
FIG. 4 is a cross-sectional view of the commercial airliner landing gear strut of FIG. 3 shown in a compressed position.

Referring now to FIG. 3, there is shown a conventional and commercially available telescopic main landing gear 7 shown at full telescopic extension. Landing gear 7 consists of an outer housing of the strut 9, which together with sliding piston 11, are the main components of the telescopic landing gear strut. Contained within the landing gear strut are fluids which include hydraulic liquid (referred to herein as hydraulic fluid 13) and gas 15. Preferably the gas 15 is nitrogen, but may contain other atmospheric gasses including oxygen. Located at the top of strut outer housing 9 is an access port 17. Access or servicing port 17 is the location at which strut 7 is commonly re-serviced. New components which make up the apparatus of this invention are attached at the top of strut outer housing 9, at servicing port 17, to allow access to the working pressure of the gas 15 contained within telescopic strut 7. Connected to the top of outer strut housing 9, via servicing port 17, by way of a coupling 18, is a small accumulator 19. Accumulator 19 is a small vessel to act as a chamber of extra volume, to allow gas 15 to retreat into as the telescopic piston 11 compresses into strut housing 9, thus increasing internal pressure for gas 15. The accumulator 19 communicates with the interior of the strut by way of the port 17. Attached to either the accumulator 19 or the coupling 18 is a commercially available oxygen sensor 21 which detects and measures any oxygen content which may be introduced into strut 7. Additionally, a pressure sensor 25 is attached to either the accumulator 19 or the coupling 18 to measure the changing gas pressure within accumulator 19 as well as the pressure of all of the landing gear strut gas 15, via servicing port 17. Of the numerous designs and varieties of oxygen sensors available of the market, the "wide-band oxygen sensor" is preferred for this embodiment. Oxygen sensor 21 becomes most effective if the gas it is monitoring is not static, but instead is moving, with gas flow over the surface of oxygen sensor 21 (as will be illustrated and described further in FIG. 4). Having an auxiliary space/volume within accumulator 19, for the gas to retreat to as the strut compresses, creates flow across oxygen sensor 21 and allows it to be more effective in identifying and measuring any oxygen within the vessels. A service access port 26 is provided on the accumulator 19 (as shown) or on the coupling 18, which fitting 26 allows the servicing of the strut, such as by adding gas. The accumulator 19 can be a vessel from the coupling 18, or can be incorporated into the coupling 18.

Referring now to FIG. 4, there is again shown the telescopic main landing gear 7, shown at a posture of telescopic compression. Contained within the landing strut 7 are fluids which include hydraulic liquid (referred to herein as hydraulic fluid 13) and gas at a higher pressure or compression (designated as 15-a) than in the uncompressed strut. With the internal volume of the telescopic strut 7 now reduced, and hydraulic fluid 13 being a non-compressible liquid, gas 15 (from FIG. 3) now becomes more compressed gas 15-a. An increase in gas pressure inside the strut results in a pressure differential so that nitrogen gas flows from the strut 7 into the accumulator 19. The bundle of vertical arrows 23 illustrate the movement of gas 15-a over the monitoring surface of oxygen sensor 21, as telescopic piston 11 slides further into outer strut housing 9, thus reducing the overall volume within landing gear strut 7 and forcing the gas 15-a into accumulator 19.

Conversely, as the aircraft takes off, the strut posture changes from compressed (FIG. 4) to extended (FIG. 3). This extension of the strut causes the gas to flow in the reverse direction shown in FIG. 4, that is from the accumulator 19 into the strut 7, past the oxygen sensor 21.

When the aircraft is flying, with no weight on the landing gear strut, the internal pre-charge pressure within the strut will force the telescopic strut to full extension. This full extension is caused by a pre-measured pressure and thus relates to a known volume within the strut. This known volume cannot be increased, only decreased as the strut compresses. As the aircraft lands, the strut compresses, thus reducing internal strut volume as internal pressure increases. This application is taught by this inventor in previous U.S. Pat. No. 7,274,309 and U.S. Pat. No. 7,274,310 which measure aircraft landing gear strut collapse rate, thus aircraft vertical velocity and further the Kinetic Energy generated at initial touch-down by comparing changes in strut pressure as it relates to changes in strut volume.

Figure 5:
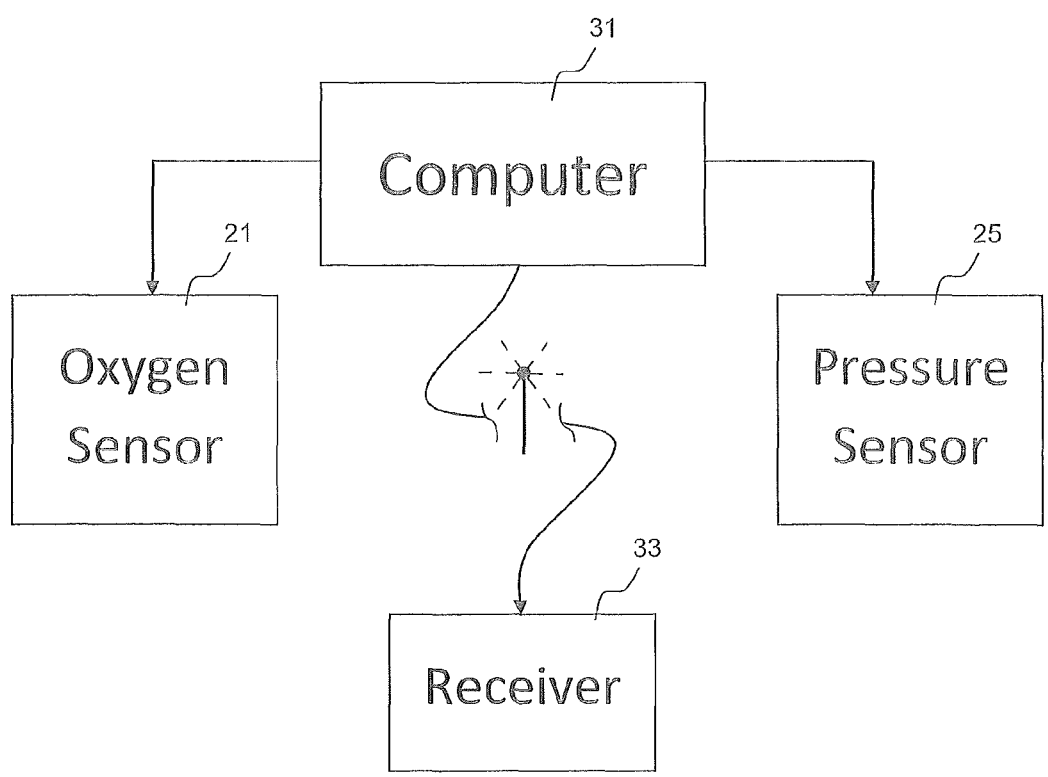
FIG. 5 is a schematic block diagram showing the computer and sensors.

Referring to FIG. 5, the onboard aircraft computer 31 is connected to and receives the data inputs from oxygen sensor 21 and pressure sensor 25. The computer 31 is a typical aircraft/FAA certified QAR "Quick Access Recorder" (for example an Avionica—"miniQAR MKIII, ACMS-Capable, 3G Wireless GSE Module" could be used). The computer identifies, then calculates the amount and concentration of oxygen to be found contaminating the nitrogen gas, and records the date within its computer memory. The computer 31 has memory and a clock.

The recorded data can be accessed in a number of ways. Shown is a wireless scheme that uses a cellular telephone to transmit the data to a receiver 33 located off of the aircraft 1, such as might occur in a maintenance depot or maintenance location. An alternative is to provide a wireless fidelity (Wifi) connection. Still another alternative is to provide an electrical connector that allows a receiver 33 to be plugged into the system so as to download the recorded data.

Having a measured thus known strut "pre-charge/beginning pressure" and a previously recorded and stored known internal strut plus accumulator volume, along with an identified and measured amount of oxygen contamination, allows for the further computation and verification of the amount of oxygen contamination by comparison of increasing oxygen sensor data inputs as they relate to the changing volume contained within the landing gear strut 7 and accumulator 19.

The method will now be described. Oxygen measurements are taken by the oxygen sensor 21. The frequency of the oxygen measurements can be in accordance with a number of schemes. For example, the oxygen measurements can be continuously taken. Alternatively, the oxygen measurements can be periodic, for example, every hour, once a day, etc. In still another embodiment, an accelerometer can be provided to measure when the aircraft touches down. The oxygen measurement can be measured within a predetermined elapsed period of time from the touchdown of the aircraft. Such a measurement can be taken when the aircraft is at the gate. In still another embodiment, the oxygen measurements can be taken when the pressure sensor detects a pressure change that indicates a take-off or a landing of the aircraft. A take-off is detected by a sudden drop in strut pressure, while a landing is detected by a sudden increase in strut pressure.

The oxygen measurements are stored in memory, along with the time of the measurements. The measurements are processed either onboard the aircraft or off of the aircraft, such as at a maintenance location. The oxygen measurements are processed to look for increases of oxygen inside of the strut or in the alternative to look for oxygen levels that are above a predetermined threshold. If an increase in oxygen, or a violation of threshold, is found, then an indication is provided, such as a message on a computer display at a maintenance location. This alerts maintenance personnel to take corrective action so that they can purge the gas and the oxygen from the strut and replace it with nitrogen gas.

Still another way to determine if the strut contains too much oxygen is to determine the amount of oxygen in relation to the full volume of compressed gas. The pressure sensor can be used to determine the change in gas following. This then allows the determination of the ratio of oxygen to total volume of gas within the strut. Still another way is to monitor and measure the amount of oxygen gas as a percentage of other gasses (such as nitrogen) within the strut.

Still another way to determine if the strut contains too much oxygen is to determine the amount of oxygen that can cause combustion inside the strut during strut operations. This level can be referred to as a combustion level. If a combustion level of oxygen is detected in the strut then a second type of indication can be provided to alert ground maintenance personnel that the strut should be immediately serviced by purging the interior gas.

If need be, temperature and/or pressure compensations can be made to the oxygen measurement.

The oxygen measurements can be related to changes in strut volumes by correlating the pressure sensor measurements, which are also recorded, as well as the times that pressure measurements are recorded. For example, if an increase in strut pressure is found, which increase indicates that maintenance personnel have injected gas into the strut, and this is followed shortly thereafter by an increase in oxygen, this indicates that the maintenance procedure introduced oxygen into the strut. Such an increase in strut pressure can be determined by monitoring a history of pressures over an elapsed period of time. For example, if the aircraft is not moving and there is a stair step increase in strut pressure, such as when the pressure increases and remains at that increased level, this indicates that additional gas has been provided to the strut. Movement of the aircraft can be detected by monitoring a history of strut pressure. For example, if the strut pressure is constant over a period of time this indicates the aircraft is not moving. Conversely, if the strut pressure shows small increases and decreases, this indicates the aircraft is moving on the ground. Alternatively, aircraft movement can be monitored by monitoring an accelerometer or accelerometers on the aircraft, GPS (global positioning satellite system), etc.

Figure 6:
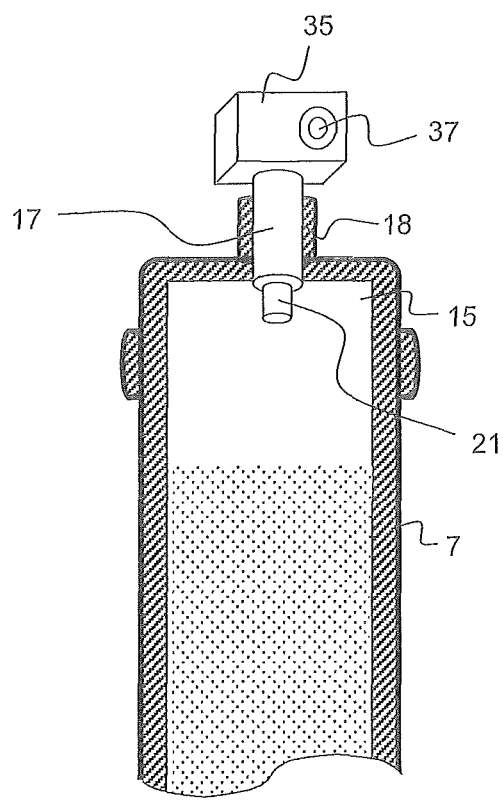
FIG. 6 is the inspection apparatus in accordance with another embodiment.

Further embodiments can be utilized as well. For example, as shown in FIG. 6, an oxygen sensor 21 is connected to the strut without an accumulator. The oxygen sensor 21 is connected by way of the fitting 18 and is exposed to the gas inside of the strut. A processor 35 is connected to the oxygen sensor. The processor 35 performs similar functions and processes as the coupler 31. The processor contains a clock and memory and monitors the level of oxygen in the strut. The processor also contains an indicator that alerts maintenance personnel to increase levels of oxygen in the strut. For example, the indicator can be a light 37. When maintenance personnel are checking the aircraft, if they see an illuminated light, this indicates an increased oxygen level in the strut and corrective action should be taken. The processor looks for increases in oxygen levels or for oxygen levels that exceed a predetermined threshold, as discussed above. Furthermore, the processor can allow maintenance personnel to download the information which includes oxygen level measurements and times of those measurements.

There are advantages of having the ability to identify oxygen contamination with the landing gear strut. One advantage is the ability to promptly re-service the landing gear strut, to purge and remove the contaminated gas and replace it with pure nitrogen gas. Another advantage is providing data on oxygen contamination, thus having justification for the landing gear manufacturer to extend or escalate the Calendar Life limitation, thus adding a financial benefit to the aircraft operator, by reducing the overall operating costs associate with the aircraft landing gear. Still another advantage is to purge oxygen from the strut, thus avoiding the possibility of internal combustion within the landing gear.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. An apparatus for monitoring a landing gear strut of an aircraft, comprising:
   a) the landing gear strut being telescopic and containing an interior gas;
   b) an oxygen sensor mounted to the landing gear strut and exposed to the interior gas of the landing gear strut;
   c) a processor connected to the oxygen sensor, the processor recording information from the oxygen sensor.

2. The apparatus of claim 1 wherein the landing gear strut comprises a service port, the oxygen sensor located in the service port.

3. The apparatus of claim 1 wherein the landing gear strut comprises a service port, further comprising a coupling connected to the service port, the oxygen sensor connected to the coupling.

4. The apparatus of claim 1, further comprising an accumulator in communication with the landing gear strut interior gas, the oxygen sensor located so that the interior gas flows relative to the oxygen sensor as the strut compresses and decompresses.

5. The apparatus of claim 1, further comprising a pressure sensor exposed to the interior gas, the processor connected to the pressure sensor, the processor recording information from the oxygen sensor when the pressure sensor detects a change in strut pressure.

6. The apparatus of claim 1, further comprising a pressure sensor exposed to the interior gas, the processor connected to the pressure sensor, the processor recording information from the oxygen sensor when the pressure sensor detects a predetermined strut pressure when the strut is fully extended.

7. A method of monitoring a landing gear strut of an aircraft, the landing gear strut being telescopic and containing interior gas, comprising the steps of:
   a) measuring oxygen in the interior gas;
   b) recording the measurement;
   c) determining by a processor if the measured oxygen is within an acceptable limit;
   d) if the measured oxygen is not within the acceptable limit, then providing an indication.

8. The method of claim 7 wherein the step of measuring oxygen in the interior gas further comprises the step of measuring oxygen as the strut is compressing or extending.

9. The method of claim 7 wherein if an indication is provided, then purging the interior gas from the strut.

10. The method of claim 7 wherein the strut has an estimated calendar life based upon internal corrosion of the strut, further comprising the steps of:
    a) taking plural measurements of oxygen in the interior gas;
    b) using the measurements to adjust the calendar life limitation of the strut.

11. The apparatus of claim 7, further comprising the steps of:
    a) measuring the pressure of the landing gear strut interior gas;
    b) detecting a change in the strut pressure; and
    c) recording the measurement of oxygen in the interior gas during the change in strut pressure.

12. The apparatus of claim 7, further comprising the steps of:
    a) providing a predetermined strut pressure when the strut is fully extended;
    b) measuring the pressure of the strut interior gas;
    c) detecting from the pressure measurement when the strut is fully extended; and
    d) recording the measurement of oxygen in the interior gas when the strut is fully extended.

13. A method of monitoring a landing gear strut of an aircraft, the landing gear strut being telescopic and containing interior gas, comprising the steps of:
    a) measuring oxygen in the interior gas;
    b) recording the measurement;
    c) determining by a processor if the measured oxygen is within an acceptable limit;
    d) if the measured oxygen is not within the acceptable limit, then providing an indication; and
    e) the step of determining if the measured oxygen is within an acceptable limit further comprises determining if the measured oxygen can cause combustion in the strut interior.

* * * * *